(12) United States Patent
Seetharaman et al.

(10) Patent No.: US 6,978,423 B2
(45) Date of Patent: Dec. 20, 2005

(54) CONTEXT BASED VIEW DESIGN TO SUPPORT CLIENT SIDE MULTI-THREADING

(75) Inventors: Vijay Seetharaman, Wellington (NZ); Sundaresan Venkataraman, Easet Seen London (GB); Phillip Wong, Wellington (NZ)

(73) Assignee: International Business Machines Corporation, Armonk, NY (US)

( * ) Notice: Subject to any disclaimer, the term of this patent is extended or adjusted under 35 U.S.C. 154(b) by 611 days.

(21) Appl. No.: 09/966,131

(22) Filed: Sep. 27, 2001

(65) Prior Publication Data

US 2002/0075314 A1 Jun. 20, 2002

(30) Foreign Application Priority Data

Sep. 29, 2000 (NZ) ..................................... 507241

(51) Int. Cl.7 ............................ G06F 3/00; G06F 9/00; G06F 17/00
(52) U.S. Cl. ..................... 715/764; 715/763; 707/102; 707/103 R; 705/21; 719/313; 719/315; 719/319
(58) Field of Search ............................... 345/700, 764, 345/763; 707/103 R, 102; 705/21; 714/313, 714/315, 319; 715/825, 866

(56) References Cited

U.S. PATENT DOCUMENTS

| | | | | |
|---|---|---|---|---|
| 5,960,410 A | * | 9/1999 | Halpern ....................... | 705/21 |
| 6,076,092 A | * | 6/2000 | Goldberg et al. ....... | 707/103 R |
| 6,429,882 B1 | * | 8/2002 | Abdelnur et al. ........... | 345/763 |
| 6,636,242 B2 | * | 10/2003 | Bowman-Amuah ......... | 345/764 |
| 6,662,188 B1 | * | 12/2003 | Rasmussen et al. ........ | 707/102 |
| 6,665,573 B1 | * | 12/2003 | Blackman ................... | 700/116 |

OTHER PUBLICATIONS

Seetharaman, V. et al. "Isolating User Interface Design From Business Object Design Using JAVA Interface Concepts", IBM Patent Application, IBM Docket Number JP920000317US1, Filed Sep. 27, 2001. Serial Number not available.

* cited by examiner

*Primary Examiner*—Kristine Kincaid
*Assistant Examiner*—Boris Pesin
(74) *Attorney, Agent, or Firm*—Schmeiser, Olsen & Watts; John R. Pivnichny (57) ABSTRACT

A computer software system comprising a view sub-system including presentation objects which provide a user interface, a business logic sub-system including business object implementation objects which hold business data and implement business logic, a handler sub-system including controller objects which control the sequence of actions in a use case, and a view context sub-system including context objects which capture input/output data. The invention also provides a related computer program and a related method of passing data in an object oriented application.

21 Claims, 9 Drawing Sheets

CONTEXT BASED VIEW DESIGN TO SUPPORT CLIENT SIDE MULTI-THREADING

FIELD OF THE INVENTION

The invention relates to the field of computer software and software design, particularly but not solely the design and development of Object Oriented multi-threaded GUI-based client applications.

BACKGROUND OF THE INVENTION

One of the most common models currently used for implementing client applications involves dividing the essential elements of the tasks to be performed by the application among three types of objects, for example View objects, Handler objects and Business Logic objects.

Figure 1:
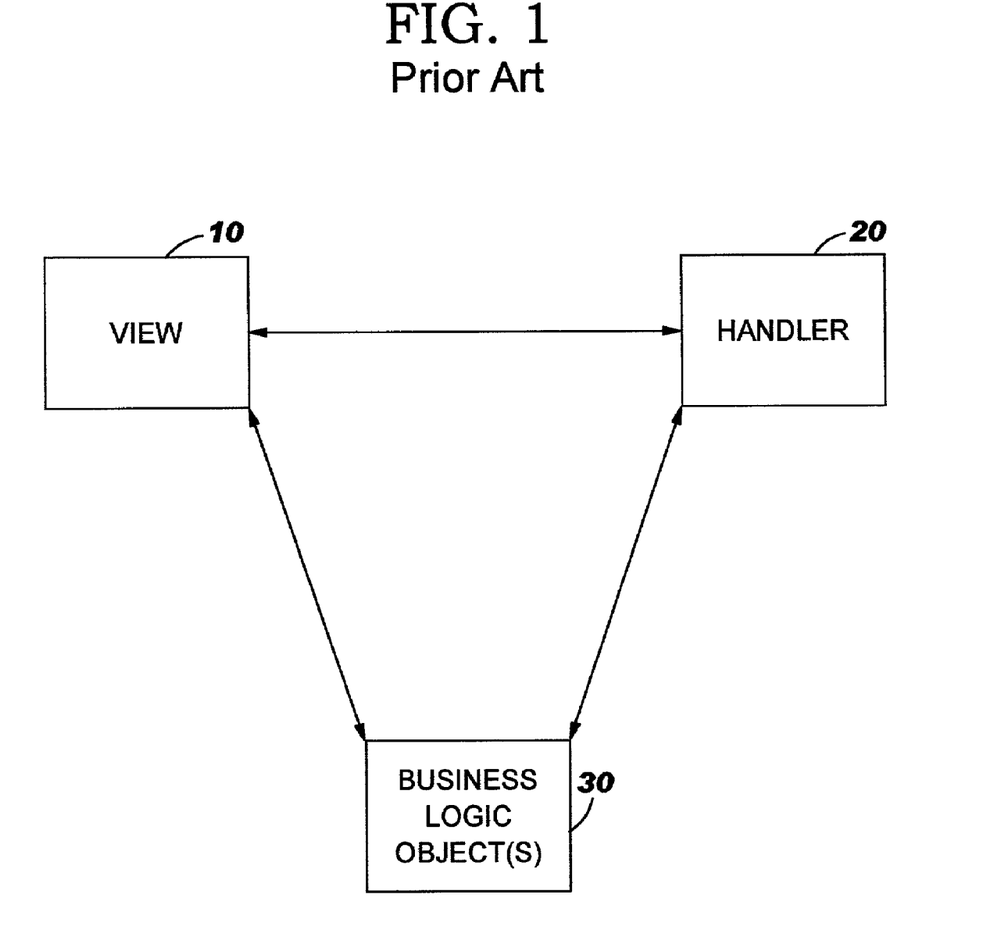
FIG. 1 shows a prior art client application model divided into view, handler and business objects.

FIG. 1 shows the typical inter-relationships between these three sub-systems.

A View object 10 is responsible for presentation details of the User Interface (UI) which is generally a Graphical User Interface (GUI). A controller or handler object 20 is responsible for managing the execution and co-ordination aspects of a task. Finally a Business logic object 30 is responsible for the business data and business logic aspects of a task.

The application can be thought of as being made up of one or more use cases or tasks. A use case may be for example finding a list of customers satisfying a given search criterion or may be changing customer details.

Each use case is captured as a handler 20 which is responsible for coordinating and controlling the sequence of actions that need to be performed to implement the use case.

Once the application identifies the use case, it creates an appropriate handler and passes control to it. In fact the application itself could be thought of as a handler.

The handler 20 must create the appropriate views for the use case and respond to any events in them.

The view essentially presents the data or business object but in theory is not concerned with the business logic (which operations are to be performed on that data or what it is for). The view is usually made up of GUI components through which the user can receive appropriate input cues and output information, for example data display fields, data entry fields, menus and buttons. It is the view object or sub-system that the user interacts with. The user may enter some data, for example, and press a button.

The handler, which is always "listening" to the view for relevant events, would then be notified that the user has requested some action to be performed and pass the data and instructions for this action to the appropriate Business Logic object.

A Business Logic Object 30 carries out the business logic for the use case. The handler 20 must create appropriate business logic object peers for the use case and invoke the appropriate methods in them.

The View and Business Logic objects can communicate directly to ascertain when the View should refresh itself, or their communication can be coordinated by the handler. The View then refreshes itself from the updated data provided by the Business Logic Object and the user is presented with the results of their request.

It will be appreciated that in a typical client GUI application a given view may participate in more than one use case. Creating a view per use case may not be a good solution as it is expensive in terms of memory and resources. It would be useful to have a model in which the view could be reused over all the use cases for which it is relevant.

In addition the complex interrelationships between the view, handler and business object model mean that data flow becomes much more complicated in a multi-threaded environment. It would also be useful to have a model in which data could be more easily transferred and persisted within each use case, even in a multi-threaded environment.

SUMMARY OF INVENTION

In broad terms in one form there is provided a computer software system comprising a view sub-system including presentation objects which provide a user interface; a business logic sub-system including business object implementation objects which hold business data and implement business logic; a handler sub-system including controller objects which control the sequence of actions in a use case; and a view context sub-system including context objects which capture input/output data.

In broad terms in another form there is provided a computer program comprising at least one view object including presentation objects which provide a user interface; at least one business logic object which holds business data objects and implements business functions; at least one handler object which controls the actions of at least one of the view objects and at least one of the business logic objects; and at least one view context object including data objects which capture the state of at least one of the view objects.

In broad terms in another form there is provided a method of passing data in an object oriented application having at least one handler object, the method comprising the steps of creating a view object with the handler object; creating a view context object with the view object; passing the view context to the handler object; updating the view context with the handler object; and refreshing the view object from the view context.

BRIEF DESCRIPTION OF THE DRAWINGS

Preferred forms of the invention will now be described with reference to the accompanying figures in which.

DETAILED DESCRIPTION OF PREFERRED FORMS

Figure 2:
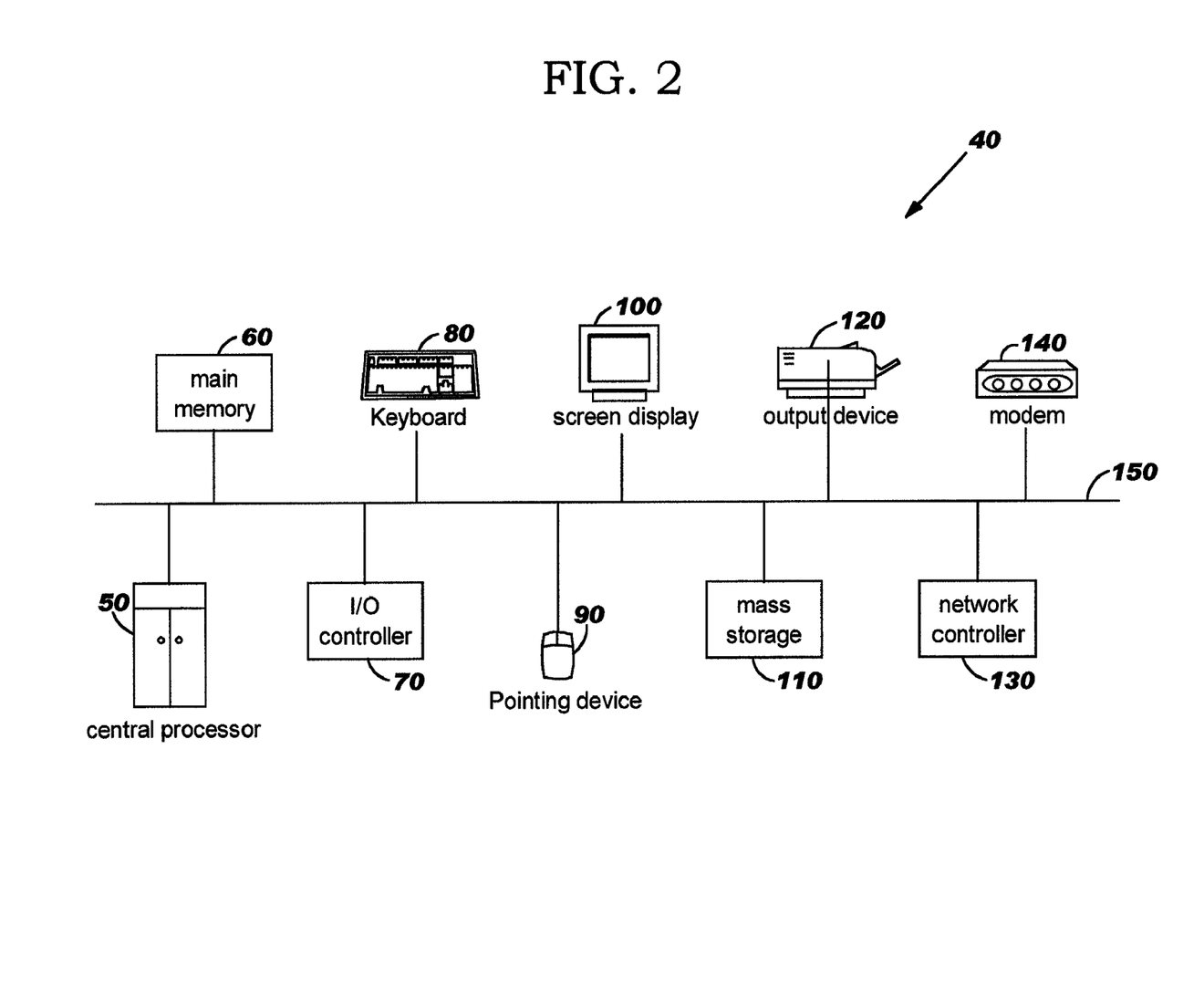
FIG. 2 shows an arrangement of typical computer equipment that could be used in connection with the invention.

FIG. 2 shows a preferred system architecture for the invention. The computer system 40 typically comprises a central processor 50, a main memory 60 for example RAM, and an input/output controller 70. The computer system 40 also comprises peripherals such as a keyboard 80, a pointing device 90 for example a mouse, touch pad or track ball, a display or screen device 100, a mass storage memory 110 for example a hard disk, floppy disk or optical disc, and an output device 120 for example a printer. The system 40 may also include a network interface card or controller 130 and/or a modem 140. The individual components of the system 40 may communicate through a system bus 150.

Preferably the invention is implemented on a computer running an operating system with a Graphical User Interface such as OS/2, Mac OS or Microsoft Windows.

Components 50, 60, 70, 80, 90, 100, 120, 130, 140 and 150 may be set up as a stand-alone computer or may be connected to further components in a network. The invention may be implemented on such a stand-alone machine or may be distributed across a network.

Figure 3:
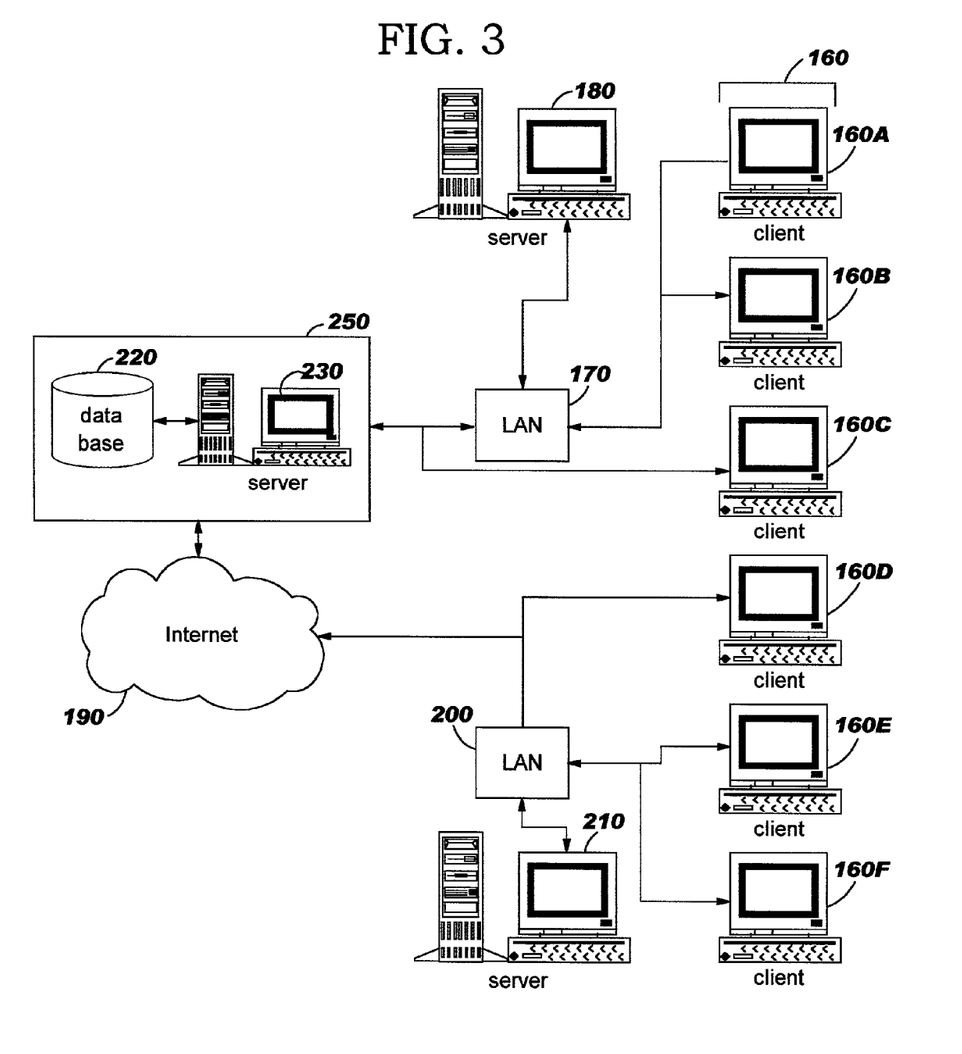
FIG. 3 shows a block diagram of a computer network arrangement.

FIG. 3 shows a preferred network set-up for the invention. Client systems may run on various clients, for example 160A, 160B, 160C, 160D, 160E and 160F, which each may comprise a personal computer or workstation described above. Each client is interfaced to a server machine 250. Each client 160 may be connected directly to the server, may be connected through a local area network or LAN or may be connected through the Internet. Any combination of wire or wireless networks may be used.

Clients 160A and 160B for example, are connected to a network 170, such as a local area network or LAN. The network 170 may be connected to a suitable network server and communicate with the server machine as shown. Client 160C is shown connected directly to the server. Clients 160D, 160E and 160F are shown connected to the server through the Internet 190. Client 160D is shown as connected to the Internet 190 with a dial-up connection and clients 160E and 160F are shown connected to a network 200 such as a local area network or LAN, with the network 200 connected to a suitable network server 210.

Preferably the invention is implemented using an Object Oriented programming language, for example the Java programming language, although any appropriate object oriented programming language may used.

The invention uses the currently popular division of essential use case elements into views, controllers and business objects as illustrated in FIG. 1; however, the invention provides a model which has been modified to include a new type of object.

Figure 4:
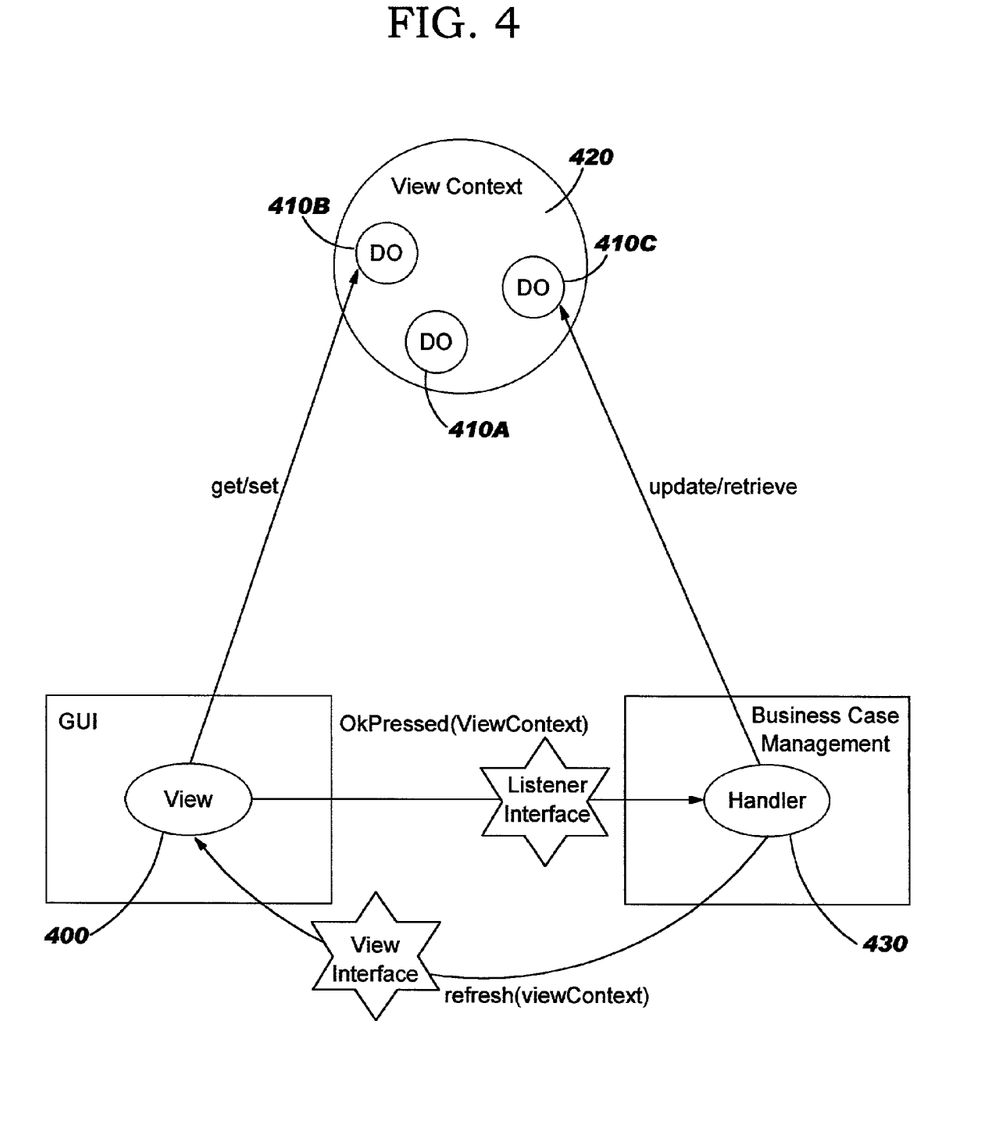
FIG. 4 shows a block diagram of the interaction between view, handler and view context objects.

FIG. 4 shows the interaction of view and handler objects according to the invention. As is usual, a view 400 is designed with the basic user interface (UI) components embedded in it. However in this invention the data used for populating the view is not captured as part of the view itself. These data objects 410 are encapsulated in a new type of object called a view context object 420.

The view context object 420 is a context object, which comes into existence at the time of the creation of a view 400. The view context object 420 comprises all the data that the view displays or takes as input. The view presents the data from the view context object 420 when it is refreshed with the view context. Given a totally new view context, the view would present different information.

The view context object 420 is typically made up of the data object interfaces for the various business objects. This means that once the handler 430 has invoked the appropriate business logic for a use case, the view context object 420 can be automatically populated with the new data which returns from the server.

A given view instance understands the make up of a view context and can address the individual elements discretely, getting and setting data objects as required.

For example, a user may enter some data for a query. The view 400 will set the data objects in the view context with the appropriate data. When an event is triggered from the view 400 such as the OK button being pressed, the View associates the event with the view context object 420 and passes the view context to the handler. The handler 430 now initiates business method calls in response to the event and the view context object 420 is updated accordingly. The handler then passes the updated view context object 420 back to the view 400 with instructions to refresh itself with the view context object 420.

The event which the view associates with the view context contains action information which governs the behavior of the view once the view context object 420 is populated with the result data. This is necessary because different user requests may require different behavior from the view. For example, a drag and drop event may result in a specific behavior by the view while a button pressed event might require a different response. When the view associates an event with its view context it is therefore predetermining its future actions because when the handler passes back the updated view context the view will refresh itself by executing the action part of the event that it originally associated with the view context.

In this way both the data for populating a view and certain behaviors of the view are abstracted away from the view itself.

FIG. 4 illustrates how the GUI and business logic areas of the application remain distinct. Through the use of the view context the data objects for the use case are made accessible to both the GUI and business logic but the division of labor remains well defined. The ability to pass the view's context around also means there is no state that needs to be maintained by either the view or the handler of the use case.

Figure 5:
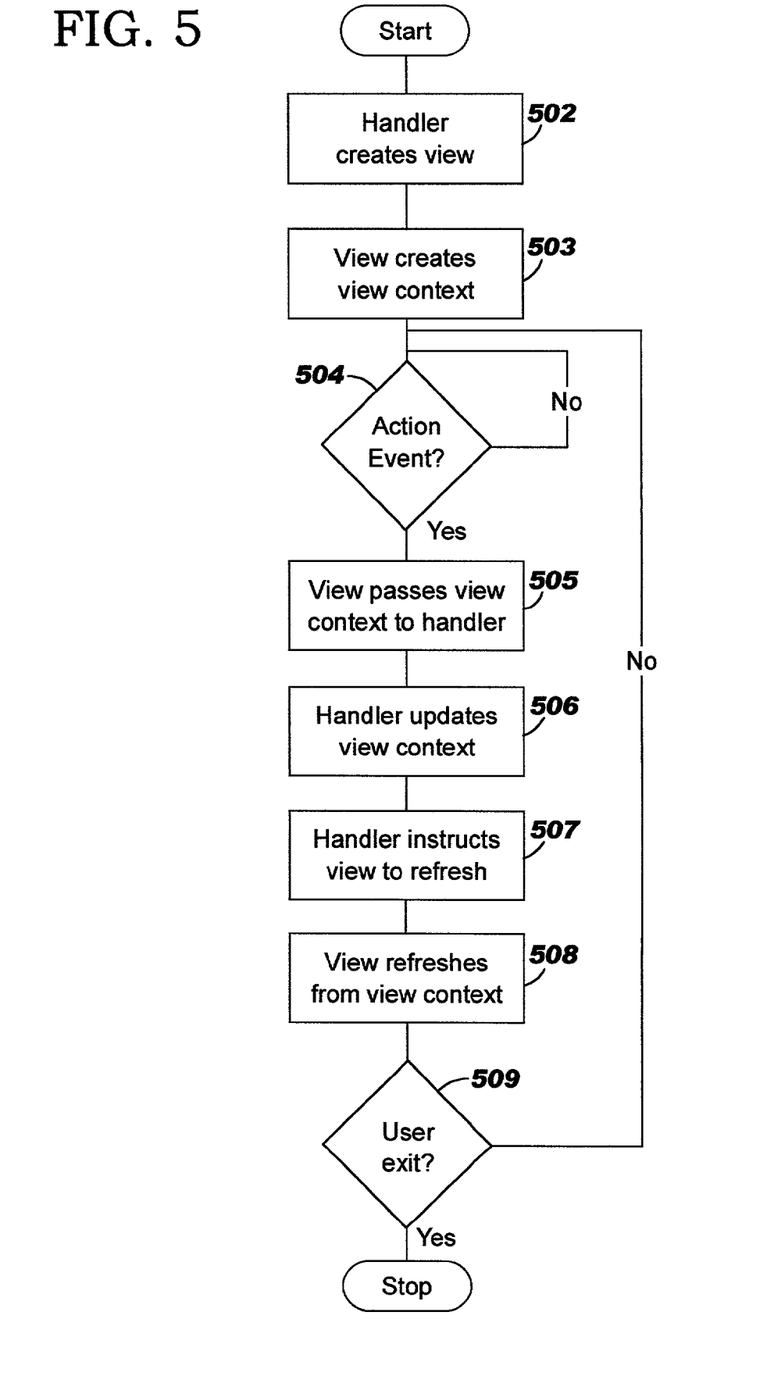
FIG. 5 is a flow diagram of a generic use case using a view context object.

FIG. 5 shows a flow chart for a possible use case. The handler creates the view at 502. The view in turn creates the view context at 503. The view now enters into its event-processing loop waiting for instructions from the user. When an event is triggered at 504, the view passes the view context and the associated event to the handler with the appropriate data values set at 505 and the handler must see to the processing of the user request. The handler therefore updates the view context as required at 506 and then instructs the view to refresh itself to display the results at 507. The view refreshes itself from the view context at 508. The view refreshes itself according to the action information from the event which was associated with the view context at 504. The user then receives the requested information. The user may now initiate another use case from the same view or may choose to close the view at 509.

Figure 6:
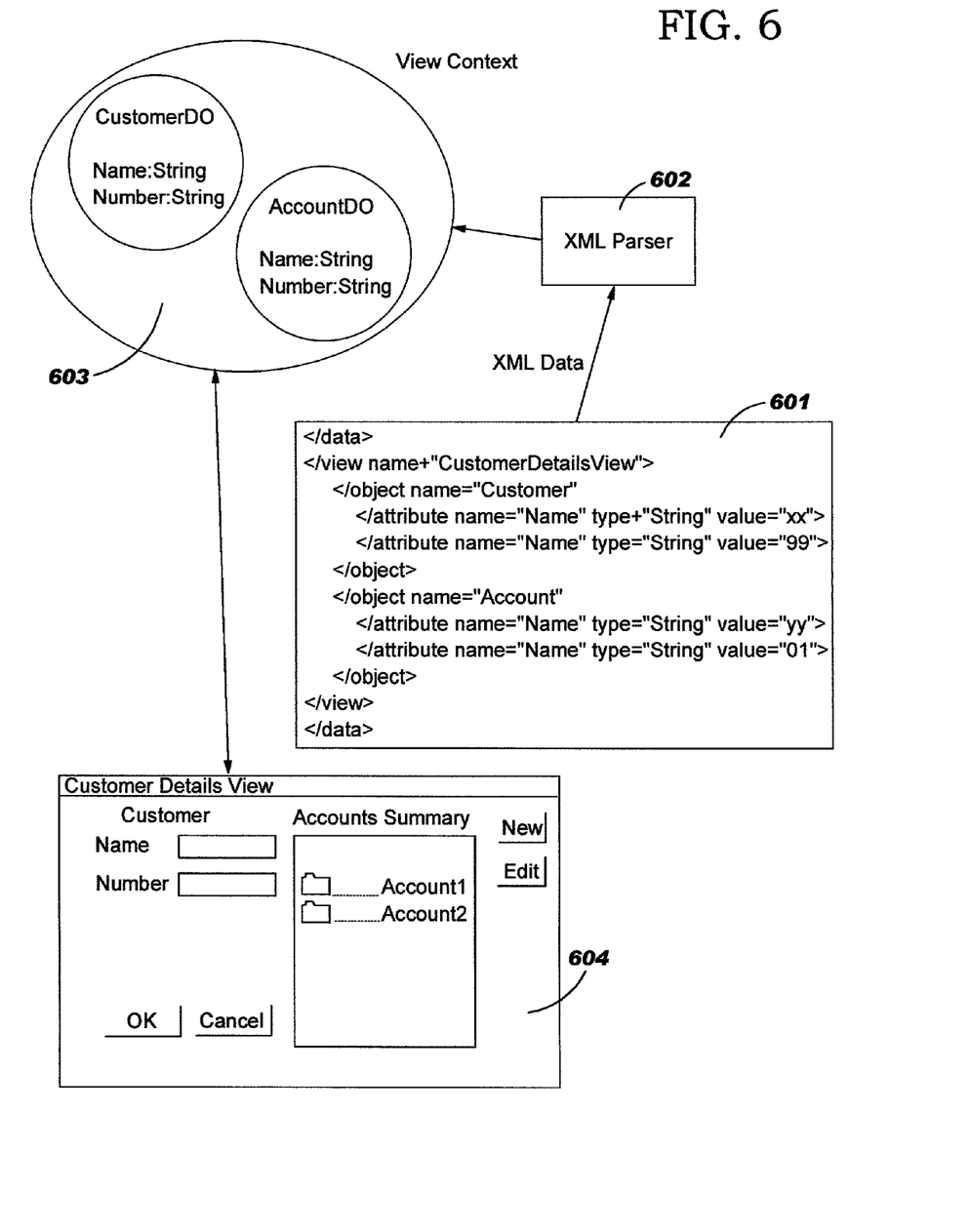
FIG. 6 shows an exemplary method of passing view context data.

FIG. 6 shows a form in which the view context may be passed. This figure illustrates the way in which the concept of a separate view context object that captures the complete state of the view enables the data to be easily transferred and persisted in emerging data representation standards like XML. In this example the client receives XML data 601 and gives it an object representation in the form of a view context 603. This is useful because in object form the context has behavior associated with it and is more helpful to the application program. The message structure, on the other hand, assists in the transfer of the data and makes it possible to more easily convert the application into a web-based solution at a later date.

Both the view context and the view may be represented in XML. In such a case the view may be created from data downloaded from the server. The client need not essentially be a browser. It may just as easily be a Java application.

Figure 7:
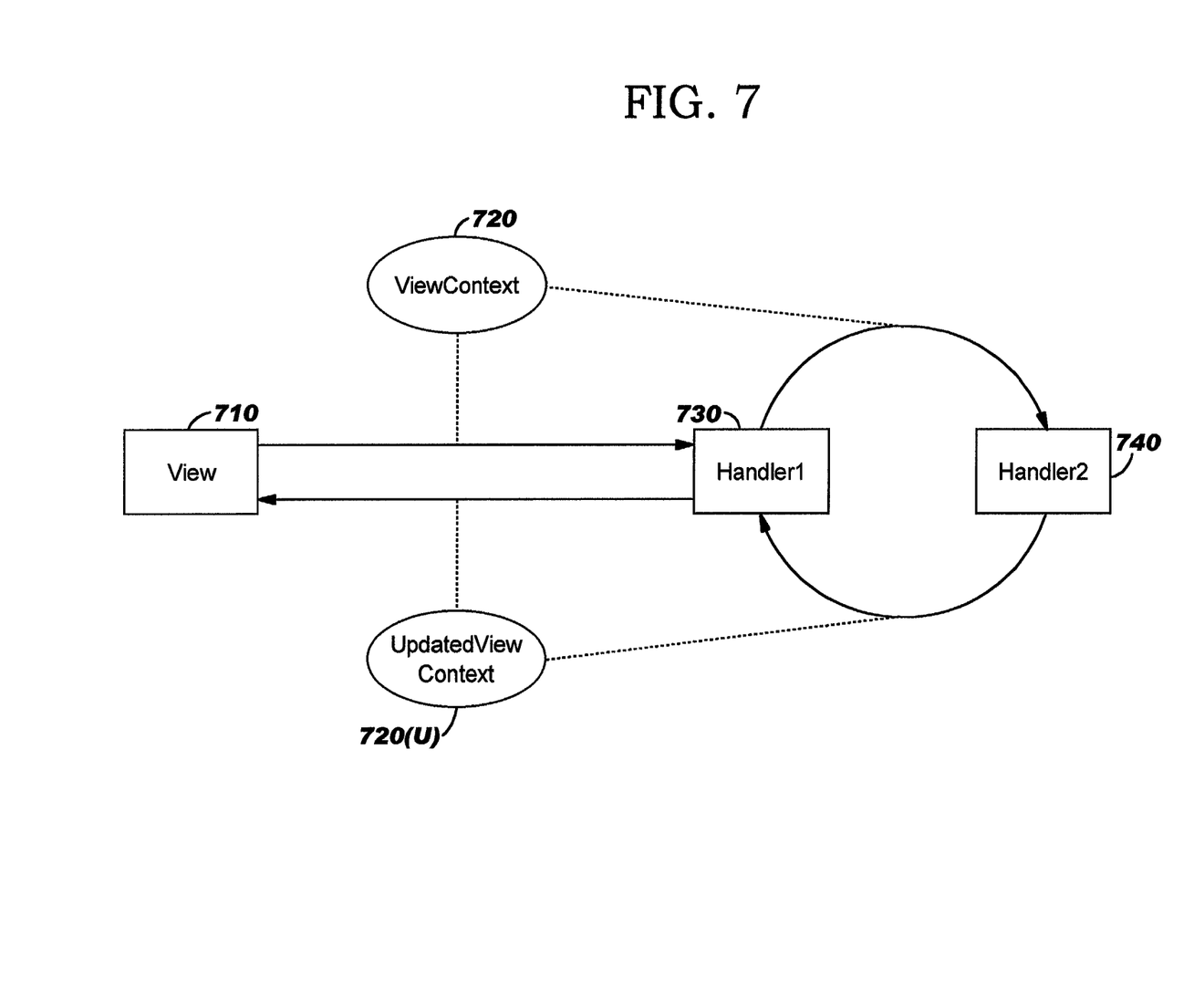
FIG. 7 shows a simple block diagram of a use case which uses more than one handler.

FIG. 7 shows how the separation of the view and its context information into separate objects also assists in the flow of use cases with more than one handler and more than one thread.

In a multi-threaded application, control often passes from one thread to another. For example, a first calling thread may post a request to a second worker thread to perform some task and then carry on with its own work. The worker thread, after completing the request, needs to hand control back to the first thread. This involves the transfer of control and the return of data to the calling thread from the worker thread. The representation of the view data in terms of contexts makes it easier to recreate the view with a new context. The view context can be easily passed across threads because the view response has also been abstracted away from the view through the use of the action information in the event which the view associates with the view context. In fact it becomes possible for the response itself to happen in a different thread.

At the start of a use case the view 710 passes its newly created context or existing context 720 to the handler of the use case 730. The use case handler 730 may then pass the view context 710 on to a second handler 740. In a threaded environment, the control would immediately return to the calling handler 730 which then would pass control back to the view 710. The view then enters the usual event-processing loop.

Once the second handler 740 has completed its task (in a second thread), it posts the reply back with the updated view context 720(U) and the view may be refreshed accordingly.

In the absence of a view context object the view itself would have to be passed around and tracked. Passing the view to a different handler that is totally unrelated to the view makes the design extremely complicated and difficult to manage.

Figure 8:
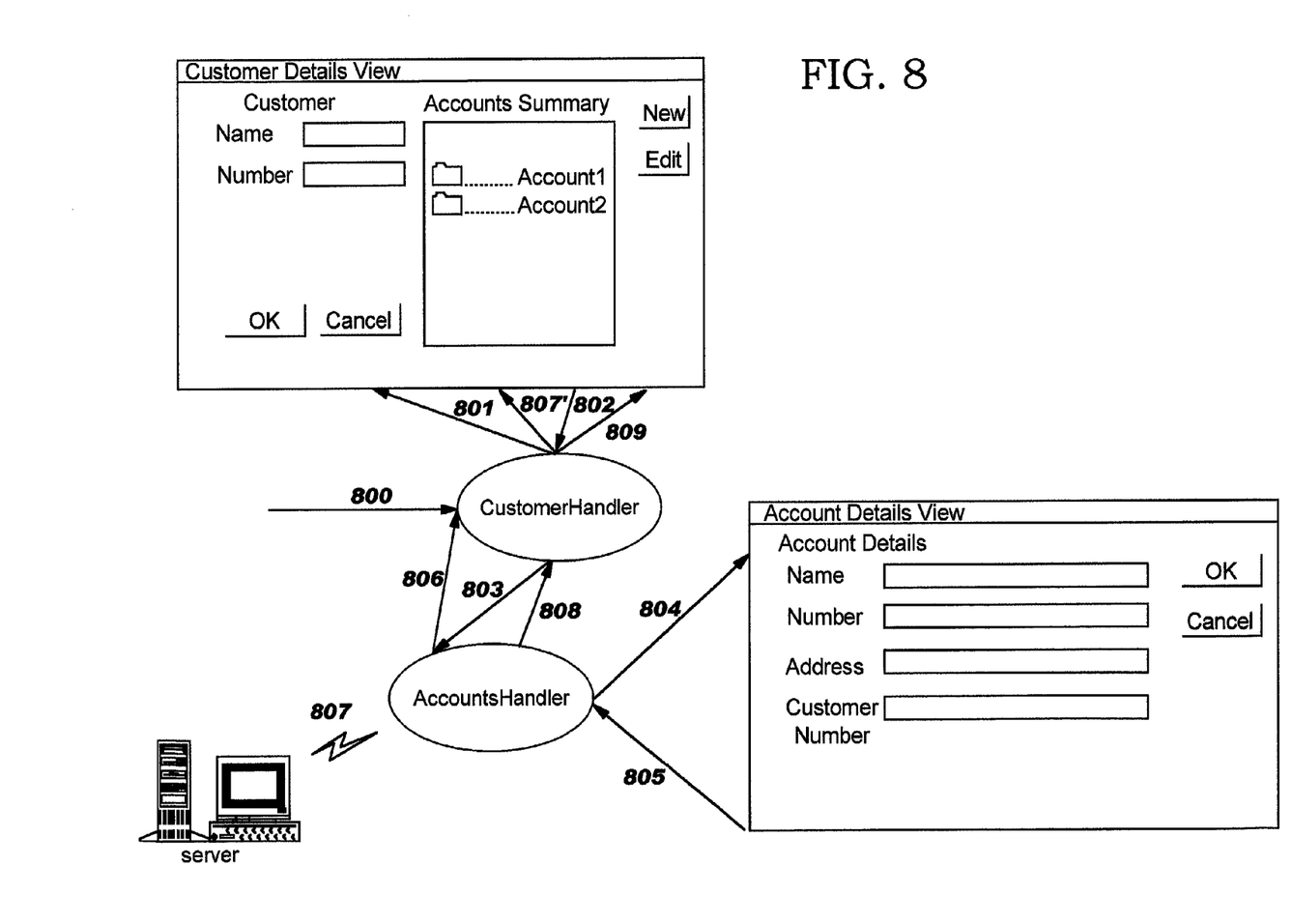
FIG. 8 is a block diagram of the flow of an example use case with more than one view and more than one handler.

FIG. 8 shows an example use case with more than one view and more than one handler. At step 800 the Customer handler receives notification that the user wishes to perform tasks related to maintaining customer details. This could take the form of a procedure MaintainCustomerDetails called on CustomerHandler.

In response, the Customer handler creates the Customer Details view, which is displayed to the user at step 801. The user, for example, may wish to edit a current account. The user selects the account and presses the edit button. The view passes the view context including the new data about the selected account and the associated event to the customer handler at 802.

The Customer handler passes control along with the View Context to the Accounts handler at 803. The Accounts handler creates the Account Details View populated with the account to be edited at 804. After the fields have been edited, control passes back to the Accounts handler at 805.

The Accounts handler uses a new thread and returns control to the Customer handler at 806. At 807 the Account handler persists the changes on the server, which could be for example an IBM AS/400, by calling appropriate business logic methods in the business object still using the new thread.

Meanwhile at 807' the original thread returns back to the event-processing loop from the Customer handler.

At 808 the accounts handler finishes its work and transfers control of the new thread to the Customer handler. After this control transfer the two threads are re-synched and the new thread is returned to the pool while the original thread is used to refresh the Customer Details View of the modified account by executing the action part of the original event object.

Figure 9:
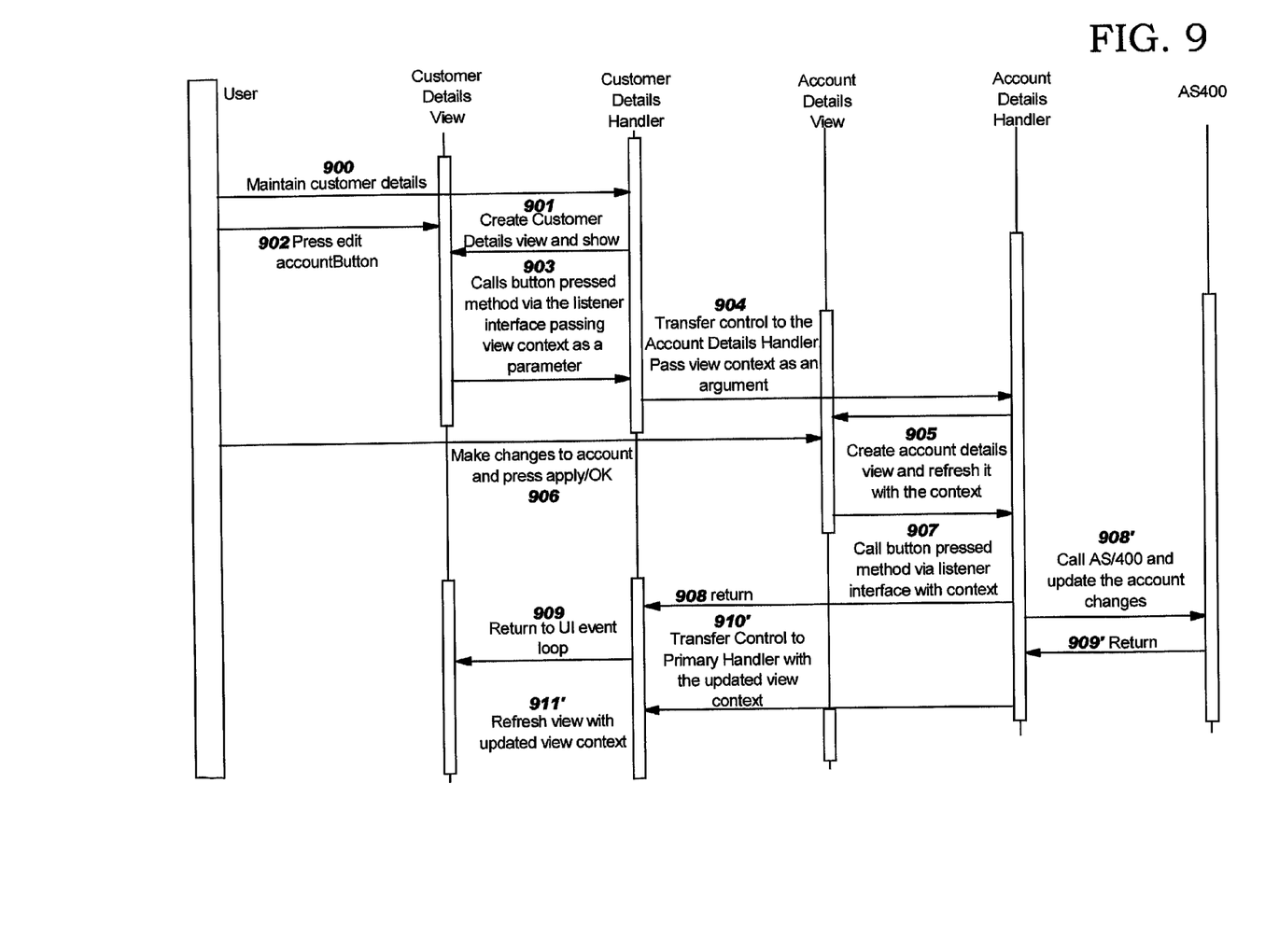
FIG. 9 is a chart of the flow of an example use case with more than one view and more than one handler.

FIG. 9 shows this same process for editing account details from the Customer Details View in a different format. Maintain Customer Details is called by the user on the Customer Details Handler at step 900. The Customer Details Handler creates the Customer Details View at 901 and displays it to the user. At 902 the user presses the edit account button on the Customer Details View. The Customer Details View associates the appropriate event with the View Context and passes the View Context to the Customer Details Handler at 903. The Customer Details Handler passes control to the Account Details Handler at 904, passing the View Context as an argument.

At 905 the Accounts Details Handler creates the Account Details View and displays it to the user. The user makes the desired changes to the account and presses the OK button at 906. The Account Details View notifies the Account Details Handler of this event and passes the View Context as an argument at 907.

At this point a second thread is initiated to complete the task, and the original thread returns control to the Customer Details Handler at 908 which returns the Customer Details View to the UI event loop at 909.

Meanwhile the second thread updates the account changes on the server database at 908' and returns at 909'. The second thread returns control to the Customer Details Handler at 910' with the updated View Context. The Customer Details Handler instructs the Customer Details View to refresh itself at 911'.

The foregoing describes the invention including preferred forms thereof. Alterations and modifications as will be obvious to those skilled in the art are intended to be incorporated within the scope hereof, as defined by the accompanying claims.

What is claimed is:

1. A computer software system executing on a computer readable medium, comprising:
   a view sub-system including presentation objects which provide a user interface;
   a business logic sub-system including business object implementation objects which hold business data objects and implement business functions;
   first and second handler sub-systems, each said handler sub-system including controller objects which control a sequence of actions by the business logic sub-system in a use case, in response to an event triggered by the view sub-system; and
   a view context sub-system including a view context object which is arranged to capture input and output data which populates the presentation objects of the view sub-system, wherein the software system is configured to have the view context object:
      passed from the view sub-system to the first handler sub-system,
      passed from the first handler sub-system to the second handler sub-system such that the view context object is updated by at least one of the first handler sub-system and the second handler sub-system, and passed after being updated from the second handler sub-system to the view sub-system and subsequently used by the view sub-system to refresh a view.

2. The computer software system of claim 1, wherein:
the view context sub-system also comprises data interfaces for the business logic sub-system.

3. The computer software system of claim 1, wherein the view context data object is updated by the at least one of the first handler sub-system and the second handler sub-system whenever business logic is executed on the view context object.

4. The computer software system of claim 1 wherein:
the view sub-system refreshes the presentation objects with the input and output data from the view context sub-system.

5. The computer software system of claim 1, wherein:
the view context sub-system is represented in a platform-independent format.

6. The computer software system or claim 1, wherein the view context object is updated by both the first handler sub-system and the second handler sub-system.

7. The computer software system of claim 1, wherein the updated view context object is passed from the second handler sub-system to the view sub-system by:
being passed from the second handler sub-system to the first handler sub-system, and subsequently
being passed from the first handler sub-system to the view sub-system.

8. A method of passing data within an object oriented software environment, said method comprising the computer-implemented steps of:
providing a view sub-system including presentation objects which provide a user interface;
providing a business logic sub-system including business object implementation objects which hold business data objects and implement business functions;
providing first and second handler sub-systems, each said handler sub-system including controller objects which control a sequence of actions by the business logic sub-system in a use case, in response to an event triggered by the view sub-system;
providing a view context sub-system including a view context object which is arranged to capture input and output data which populates the presentation objects of the view sub-system, wherein the software system is configured to have the view context object;
passing the view context object from the view sub-system to the first handler sub-system;
passing the view context object from the first handler sub-system to the second handler sub-system such that the view context object is updated by at least one of the first handler sub-system and the second handler sub-system; and
passing the updated view context object from the second handler sub-system to the view subsystem; and
refreshing a view by the view sub-system, said refreshing using the updated view context object.

9. The method of claim 8, wherein:
the view context sub-system also comprises data interfaces for the business logic sub-system.

10. The method of claim 8, wherein the view context data object is updated by the at least one of the first handler sub-system and the second handler sub-system whenever business logic is executed on the view context object.

11. The method of claim 8, wherein:
the view sub-system refreshes the presentation objects with the input and output data from the view context sub-system.

12. The method of claim 8, wherein the view context sub-system is represented in a platform-independent format.

13. The method of claim 8, wherein the view context object is updated by both the first handler sub-system and the second handler sub-system.

14. The method of claim 8, wherein the updated view context object is passed from the second handler sub-system to the view sub-system by:
passing the updated view context object from the second handler sub-system to the first handler sub-system; and subsequently
passing the updated view context object from the first handler sub-system to the view sub-system.

15. A computer program executing on a processor of a computer system to implement a method of passing data within an object oriented software environment, said method comprising:
providing a view sub-system including presentation objects which provide a user interface;
providing a business logic sub-system including business object implementation objects which hold business data objects and implement business functions;
providing first and second handler sub-systems, each said handler sub-system including controller objects which control a sequence of actions by the business logic sub-system in a use case, in response to an event triggered by the view sub-system;
providing a view context sub-system including a view context object which is arranged to capture input and output data which populates the presentation objects of the view sub-system, wherein the software system is configured to have the view context object;
passing the view context object from the view sub-system to the first handler sub-system;
passing the view context object from the first handler sub-system to the second handler sub-system such that the view context object is updated by at least one of the first handler sub-system and the second handler sub-system; and
passing the updated view context object from the second handler sub-system to the view sub-system; and
refreshing a view by the view sub-system, said refreshing using the updated view context object.

16. The computer program of claim 15, wherein:
the view context sub-system also comprises data interfaces for the business logic sub-system.

17. The computer program of claim 15, wherein the view context data object is updated by the at least one of the first handler sub-system and the second handler sub-system whenever business logic is executed on the view context object.

18. The computer program of claim 15, wherein:
the view sub-system refreshes the presentation objects with the input and output data from the view context sub-system.

19. The computer program of claim 15, wherein the view context sub-system is represented in a platform-independent format.

20. The computer program of claim 15, wherein the view context object is updated by both the first handler subsystem and the second handler sub-system.

21. The computer program of claim 15, wherein the updated view context object is passed from the second handler sub-system to the view sub-system by;

passing the updated view context object from the second handler sub-system to the first handler sub-system; and subsequently passing the updated view context object from the first handler sub-system to the view subsystem.

\* \* \* \* \*